US012117915B1

(12) United States Patent
Abay et al.

(10) Patent No.: US 12,117,915 B1
(45) Date of Patent: Oct. 15, 2024

(54) DYNAMICALLY CONTROLLED PROCESSING OF TIME SERIES DATASETS BASED ON THE DETECTION OF STATIONARY TIME SERIES GRAINS

(71) Applicant: MICROSOFT TECHNOLOGY LICENSING, LLC, Redmond, WA (US)

(72) Inventors: Nazmiye Ceren Abay, Bothell, WA (US); Nikolay Sergeyevich Rovinskiy, Redmond, WA (US); Dhawal Dilip Parkar, Bellevue, WA (US); Vijaykumar Kuberappa Aski, Bellevue, WA (US); Neil Tenenholtz, Cambridge, MA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 8 days.

(21) Appl. No.: 18/131,337

(22) Filed: Apr. 5, 2023

(51) Int. Cl.
    *G06F 11/30* (2006.01)
    *G06F 11/34* (2006.01)

(52) U.S. Cl.
    CPC ...... *G06F 11/3075* (2013.01); *G06F 11/3447* (2013.01)

(58) Field of Classification Search
    CPC .......................... G06F 11/3075; G06F 11/3447
    See application file for complete search history.

(56) References Cited

U.S. PATENT DOCUMENTS

2017/0161409 A1* 6/2017 Martin .................... G06F 17/18
2022/0114074 A1* 4/2022 Chanda ............... G06F 11/3452

FOREIGN PATENT DOCUMENTS

| CN | 108647891 B | 7/2020 |
| CN | 113377834 A | 9/2021 |
| CN | 109041099 B | 2/2022 |

OTHER PUBLICATIONS

Murphy, Adam, "An Introduction to Time Series Modeling: Time Series Preprocessing and Feature Engineering", Retrieved From: https://h2o.ai/blog/an-introduction-to-time-series-modeling-time-series-preprocessing-and-feature-engineering/, Oct. 26, 2021, 10 Pages.

T. Bex, "How to Remove Non-Stationarity in Time Series Forecasting", Retrieved From: https://towardsdatascience.com/how-to-remove-non-stationarity-in-time-series-forecasting-563c05c4bfc7, Jul. 18, 2021, 19 Pages.

* cited by examiner

*Primary Examiner* — Jigar P Patel
(74) *Attorney, Agent, or Firm* — Scott Y. Shigeta; Newport IP, LLC

(57) ABSTRACT

The disclosed techniques pertain to the dynamic control of select functions that are applied to a time series dataset based on the detection of stationary time series grains. In some configurations, a system selectively applies select functions, e.g., the application of a differencing function, to a dataset in response to determining that a number of stationary time series grains detected in the dataset meets one or more criteria with respect to a threshold. If a system determines that the number of stationary time series grains meets one or more criteria with respect to a threshold, the system can apply a differencing function to the entire dataset. By controlling the differencing function based on the detection of stationary time series grains with respect to a threshold, the system can increase the accuracy and the efficiency of a machine learning system or any other system that utilizes time series datasets.

20 Claims, 8 Drawing Sheets

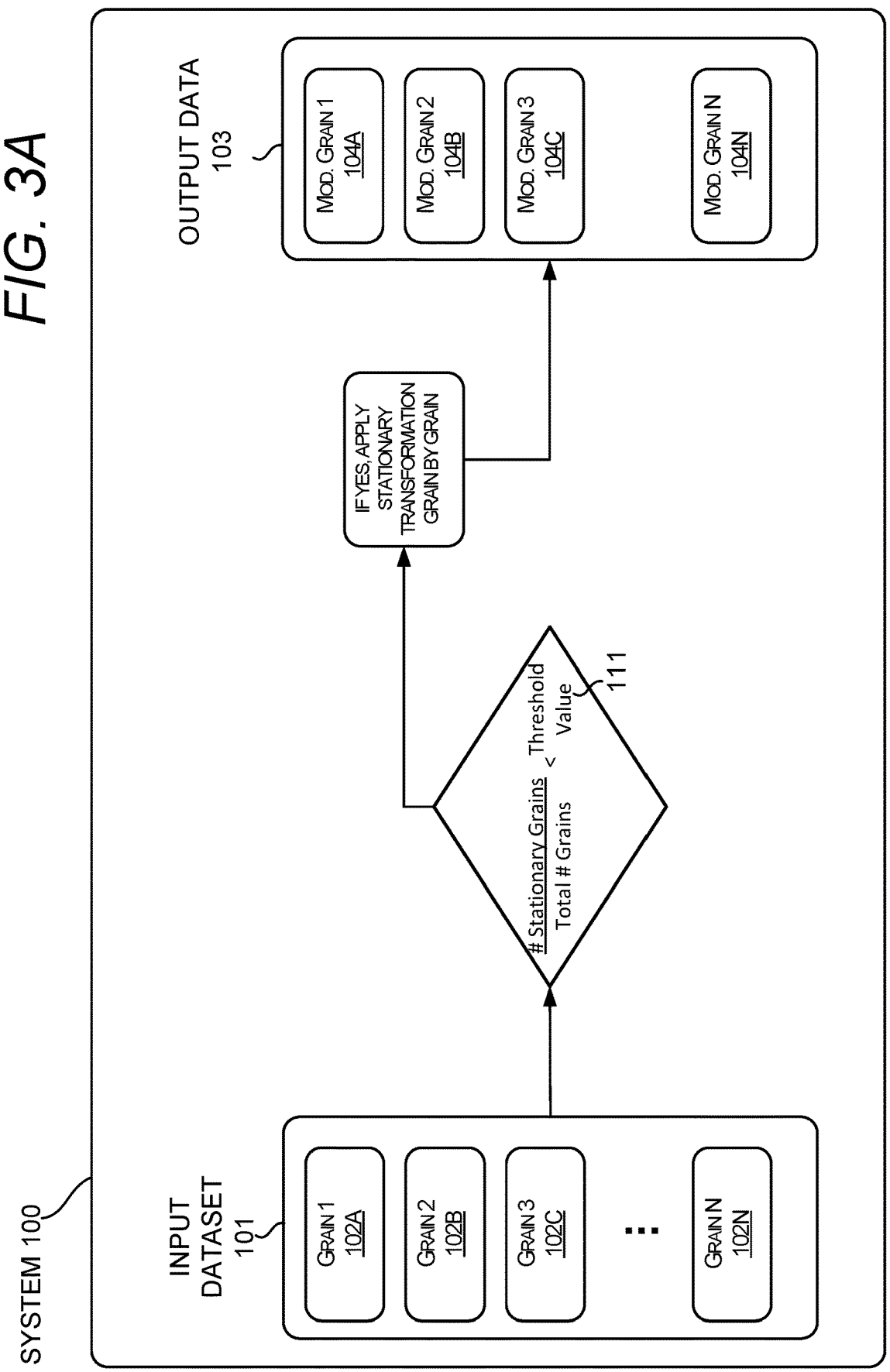

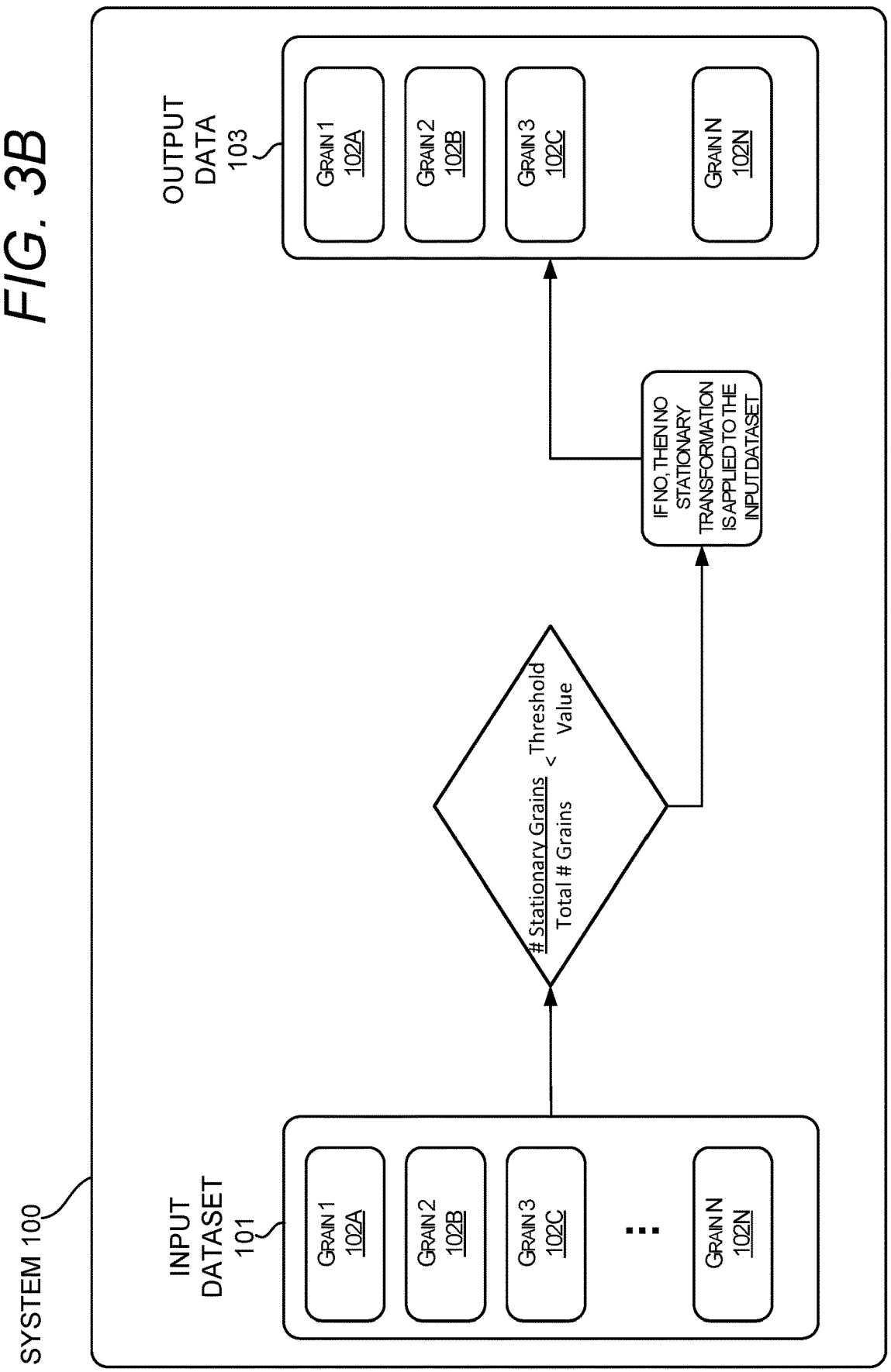

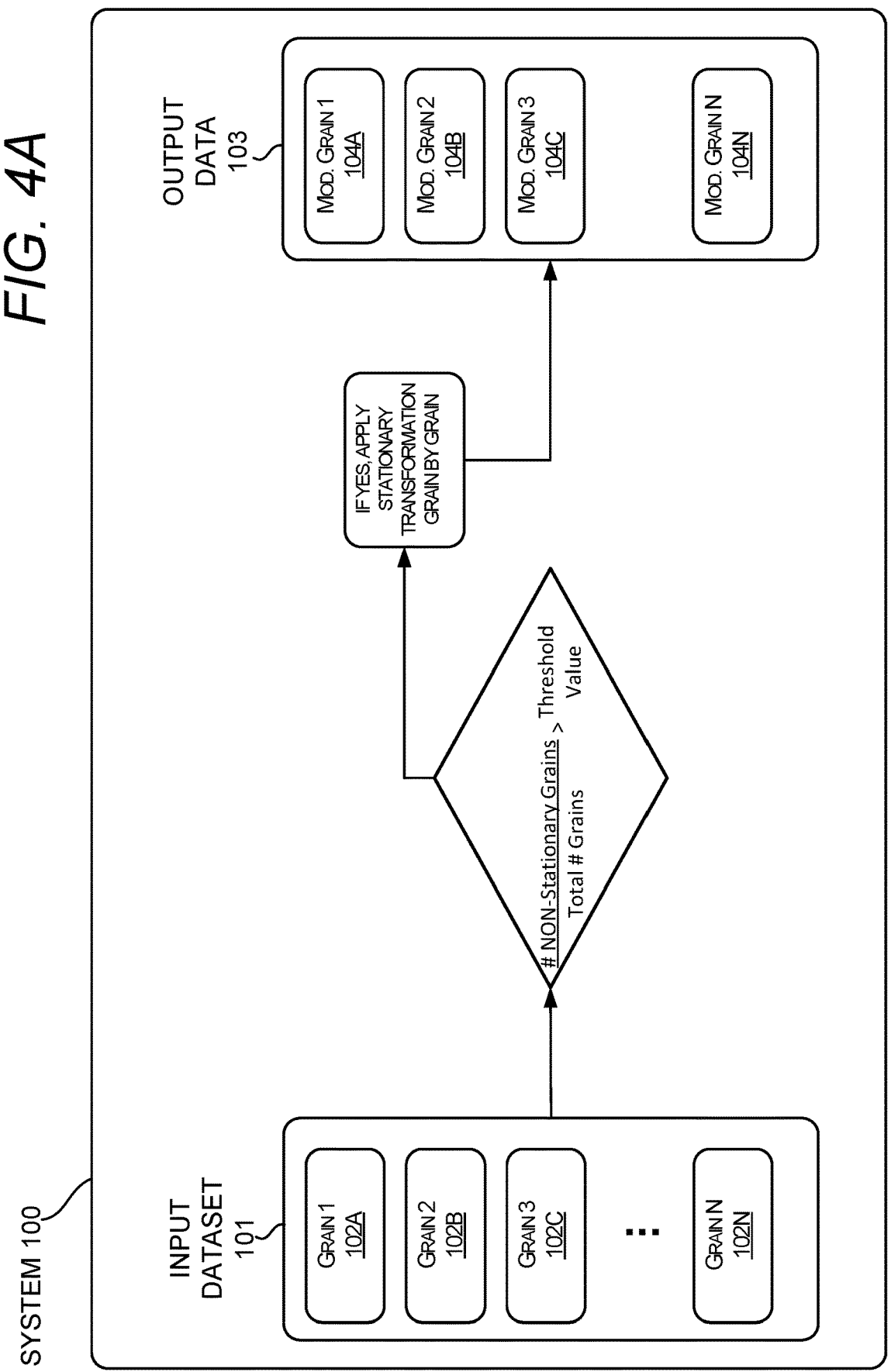

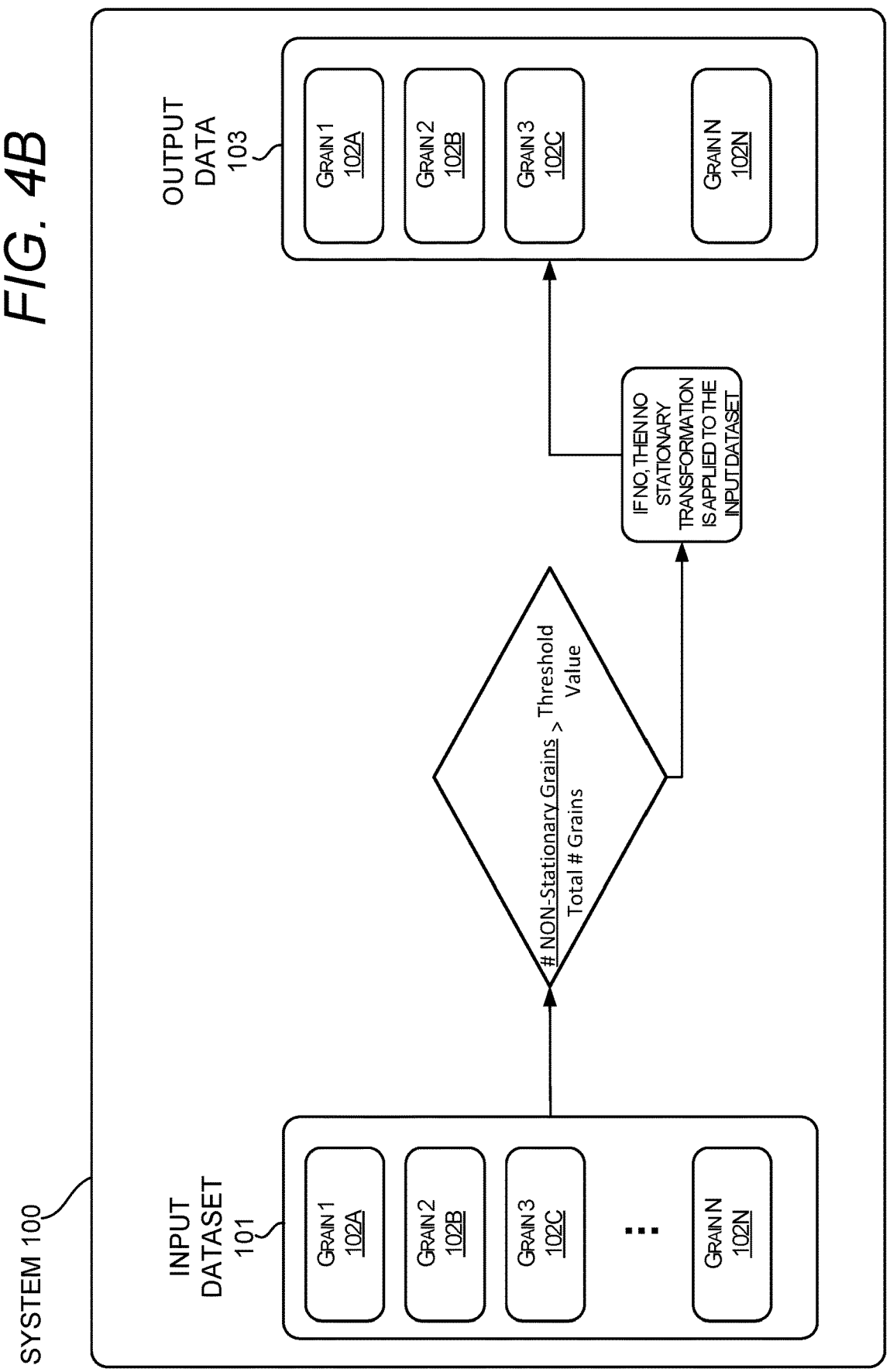

DYNAMICALLY CONTROLLED PROCESSING OF TIME SERIES DATASETS BASED ON THE DETECTION OF STATIONARY TIME SERIES GRAINS

BACKGROUND

Time series datasets are used in almost every technical field: system security, intrusion and fraud detection, tracking key performance indicators (KPIs) in manufacturing processes, and medical sensor technologies, to name a few. Time series datasets are also being created at an unprecedented scale, and the usage of computing resources for processing such data is also growing rapidly. Thus, it is critical that systems utilize optimized processing techniques to not only increase the accuracy of a desired output, e.g., forecasting data, but it is also critical that systems utilize optimized processing techniques to conserve computing resources, such as processing resources, networking resources, memory resources and power resources.

Some existing machine learning systems allow data scientists, analysts, and developers to build machine learning (ML) models with high scale, efficiency, and productivity with high model quality. Some systems allow users to run three types of ML tasks: classification, regression, and forecasting. Forecasting tasks can account for a majority of task of a system since that category of tasks are used by industries such as manufacturing, supply chain, and energy. Given the vast number of applications across many industries, there is an ongoing effort to improve the way ML models are built.

SUMMARY

The disclosed techniques pertain to the dynamic control of select functions that are applied to a time series dataset based on the detection of stationary time series grains. In some configurations, a system selectively applies select functions, e.g., the application of a differencing function, to a dataset in response to determining that a number of stationary time series grains detected in the dataset meets one or more criteria with respect to a threshold. If a system determines that a number of stationary time series grains detected in the dataset meets one or more criteria with respect to a threshold, the system can apply a differencing function to the entire dataset. The dataset that results from the differencing function can be then applied to a model, such as a machine learning model. If the system determines that the stationary time series grains detected in the dataset does not meet the one or more criteria with respect to the threshold, the system bypasses the differencing function, and the original dataset is then applied to a system to build and process models. By controlling the differencing function or any other equivalent functions based on the detection of stationary time series grains with respect to a threshold, a system can increase the accuracy and the efficiency of a machine learning system or any other system that utilizes time series datasets.

In one illustrative example, a system is configured to manage a time series dataset that includes a number of time series grains. The system can determine a threshold value. In some embodiments, the threshold value can be a predetermined number and that predetermined number can be used to process a number of datasets. In other embodiments, the threshold value can vary with time and dynamically change based on how resulting output data compares to one or more criteria. The system analyzes individual time series grains of an input dataset. In this analysis, the system can utilize any suitable technique for determining if each grain is a non-stationary time series grain or a stationary time series grain. For example, the system can identify non-stationary time series grains and stationary time series grains by the use of parametric tests, unit root tests, linear regression-based tests, nonparametric tests, or any other suitable statistical approach, to name a few. The system can then make a determination using the number of identified stationary time series grains and the threshold value. For example, the system can determine a ratio of a number of the stationary time series grains compared to the total number of grains in the input dataset, where the total number of grains being the number of the stationary time series plus the number of non-stationary time series grains. If this determined ratio is below the threshold value, the system can cause an execution of computational operations for performing a differencing function to the entire time series dataset to generate an output dataset. That output dataset can then be used as an input to a model, such as an ML model. If the system determines that the ratio is above the threshold value, the system does not execute the differencing function, and the system uses the original input dataset as an input to the model. By the use of a system that controls when specific functions are performed, e.g., a differencing function, a system can improve its overall efficiency by omitting unnecessary processing cycles, while also improving the accuracy of a system by only applying specific functions when those functions provide an actual benefit by modifying a dataset.

The overall efficiency of generating forecasting data is improved by omitting unnecessary processing cycles. The omission of unnecessary processing cycles can be achieved by analyzing the time series grains to identify a number of stationary time series grains. This allows the selection of datasets that have less than a threshold number of stationary time series grains to be analyzed. The hardware unit does not have to take the time to process datasets having more than a threshold number of stationary time series. If the system were to also perform a differencing function on datasets having more than a threshold number of stationary time series, processing cycles and energy would be used on data that does not produce any benefit, as normalizing a dataset that is already normalized would be duplicative and not change the data to improve accuracy of the output. This selection process using the criteria described herein also increases the accuracy of any results because processing datasets using a having certain ratios of stationary time series grains and non-stationary time series grains can lead to inaccurate results.

In machine learning, the applicability domain refers to the range of inputs or situations in which a model is expected to perform well. The applicability domain identifies the scenarios where the model's predictions are reliable and accurate, as well as identifying the scenarios where the model may struggle to deliver accurate results. Understanding the applicability domain is critical for machine learning practitioners and users, as it can help to identify potential risks and limitations of the model, and ensure that it is only used in scenarios where it is most effective.

One example of an applicability domain can include machine learning in timing trends on a method of manufacturing. In this example, the goal is to predict a production time based on historical production times and other relevant factors such as input materials, temperature, humidity, and other environmental factors. The applicability domain for this problem could be defined as the range of conditions under which the machine learning model is expected to perform accurately, and outside of which its predictions may be unreliable or incorrect. These conditions may include changes in production volatility, unexpected events such as accidents, part failures or shifts in materials. Understanding and defining the applicability domain for this problem is important to ensure that the model can be used effectively for methods of manufacturing and factory planning decisions.

The disclosed techniques may also be adapted to scale to large datasets via two independent, complementary methods each addressing different means in which the dataset can grow in size. In some scenarios where stationarity detection is applied independently per series and the number of series is large, each series may be evaluated in parallel across one or more units of compute thereby providing linear scaling through the allocation of additional compute. Conversely, in instances where an individual series is large in number of timesteps, the series may be divided into multiple subsets with relevant statistics computed on each subset and subsequently merged. In addition, these statistics may be computed and merged exactly whereas other realizations may require the use of numerical approximations of the statistics to enable this computation. Computation over these subsets of a series may also be parallelized across multiple units of compute to accelerate computation. When both techniques are invoked jointly, multiple parallelization strategies are attainable including, but not limited to, hierarchical implementations as well as segmented implementations. Together, these techniques may be employed selectively to accelerate the stationarity detection and/or reduce the peak memory consumption on an individual unit of compute.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 3A is a block diagram showing a process where a specified function is applied to a dataset based on the detection of stationary time series grains in the dataset.

FIG. 3B is a block diagram showing a process where a specified function is not applied to a dataset based on the detection of stationary time series grains in the dataset.

FIG. 4A is a block diagram showing a process where a specified function is applied to a dataset based on the detection of non-stationary time series grains in the dataset.

FIG. 4B is a block diagram showing a process where a specified function is not applied to a dataset based on the detection of non-stationary time series grains in the dataset.

DETAILED DESCRIPTION

A success criterion for machine learning systems is to have future predictions with a high level of accuracy. Based on this criterion of success, as a forecasting task, systems need to have high quality models that can also handle appropriate pre-processing to have a high accuracy automatically for various scenarios presented in the input data. To have accurate predictions, a system needs consistency in historical data since future forecasts depend on historical patterns. Before applying any forecasting models, a system can increase its efficiency and accuracy if the distribution of data is consistent, which means that statistical properties such as mean and variance remains constant with time. Those datasets are called "stationary time series" and they are eligible to be directly used for modeling any statistical or machine learning functions. However, if the distribution of data which is used to build the models is inconsistent with time, those time series are called "non-stationary time series" and those are not eligible for forecasting and an extra pre-processing stage is needed to transform non-stationary time series to stationary ones.

Some systems that perform forecasting provide two different types of forecasting models: time series specific forecasting models and machine learning specific forecasting models. Time series specific forecasting models have special mechanisms to handle non-stationary models and they provide accurate results. However, machine learning models lack those mechanism and they are incompetent with time series specific models, and they can generate inaccurate results. By the transforming non-stationary time series to stationary ones in response to the detection of specific scenarios, the techniques disclosed herein provide full efficiency usage for all models that are supported by existing forecasting systems. In addition, the disclosed techniques provide ways to detect and process non-stationary time series datasets that are used in forecasting tasks.

Figure 1:
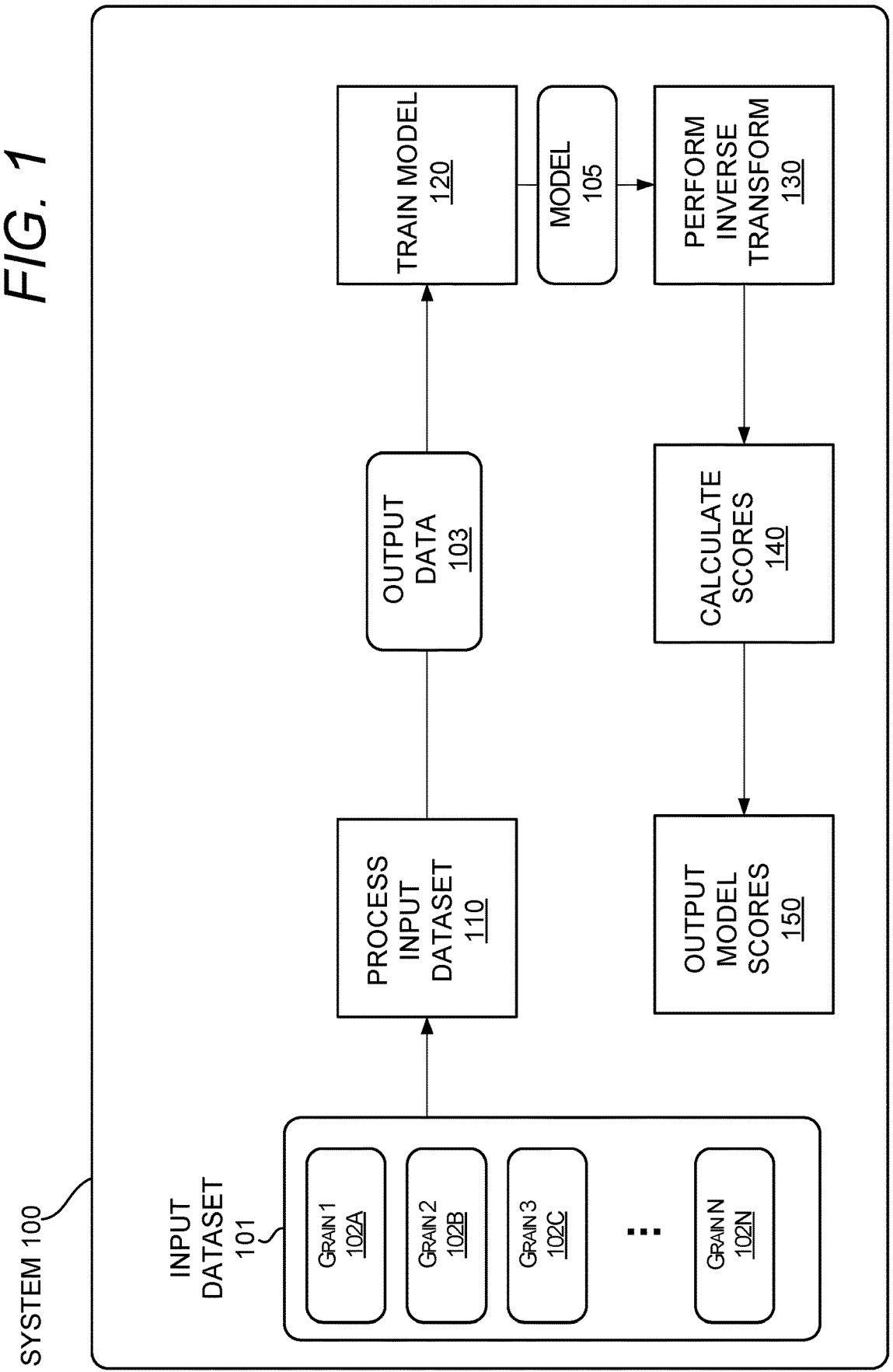
FIG. 1 is a block diagram of a system for controlling select functions that are applied to a time series dataset based on the detection of stationary time series grains within the dataset.

FIG. 1 is a block diagram of a system for controlling select functions that are applied to a time series dataset based on the detection of stationary time series grains. A shown, the system 100 can receive an input dataset 101, which is also referred to herein as a dataset 101 or an original dataset 101. The dataset 101 can include individual time series grains 102, also referred to herein as grains 102. Each time series grain can include discrete sets of data that provide values over a given time period. Each time series can include data pertaining to the same time period, partially overlapping time periods, or in some instances, each grain can cover different time periods. For instance, each grain may provide an output for a manufacturing process for a product over a particular time period, e.g., a year. Each grain may include output data from individual factories. For instance, the first grain 102A may provide a manufacturing output for a first factory, the second grain 102B may provide a manufacturing output for a second factory, etc.

Once the dataset 101 is received by the system, the system can selectively apply functions, e.g., a differencing function, to the dataset in response to determining that a number of stationary time series grains detected in the dataset meets one or more criteria with respect to a threshold. If the system determines that a number of stationary time series grains detected in the dataset meets one or more criteria with respect to a threshold, the system can apply a select function to the entire dataset 101. In this scenario, the system can apply a select function such as a stationary transformation on a grain-by-grain basis to the dataset 101. This produces output data 103 having modified grains. If the system determines that the number of stationary time series grains detected in the dataset does not meets the one or more criteria with respect to the threshold, the system does not apply the select function to the dataset 101. In this scenario, the output data 103 is just the input dataset 101, which is not subjected to any select processing that involves stationary transformations or differencing.

The output data 103 can be then applied to a model, such as a machine learning model. In some embodiments, the output data 103 can be used for a process to train models 120. The system can also involve other processes for performing an inverse transform 130, a score calculation 140, and an output process 150 for communicating the scores to systems, such as a manufacturing system. By controlling the differencing function or any other equivalent functions based on the detection of stationary time series grains with respect to a threshold, the system can increase the accuracy and the efficiency of a machine learning process or any other system that utilizes time series datasets. The forecast can be based from a timeframe, where the forecast indicates a trend based on at least one of a straight-line projection, a moving average projection, a simple linear regression projection, or a multiple linear regression projection.

Figure 2:
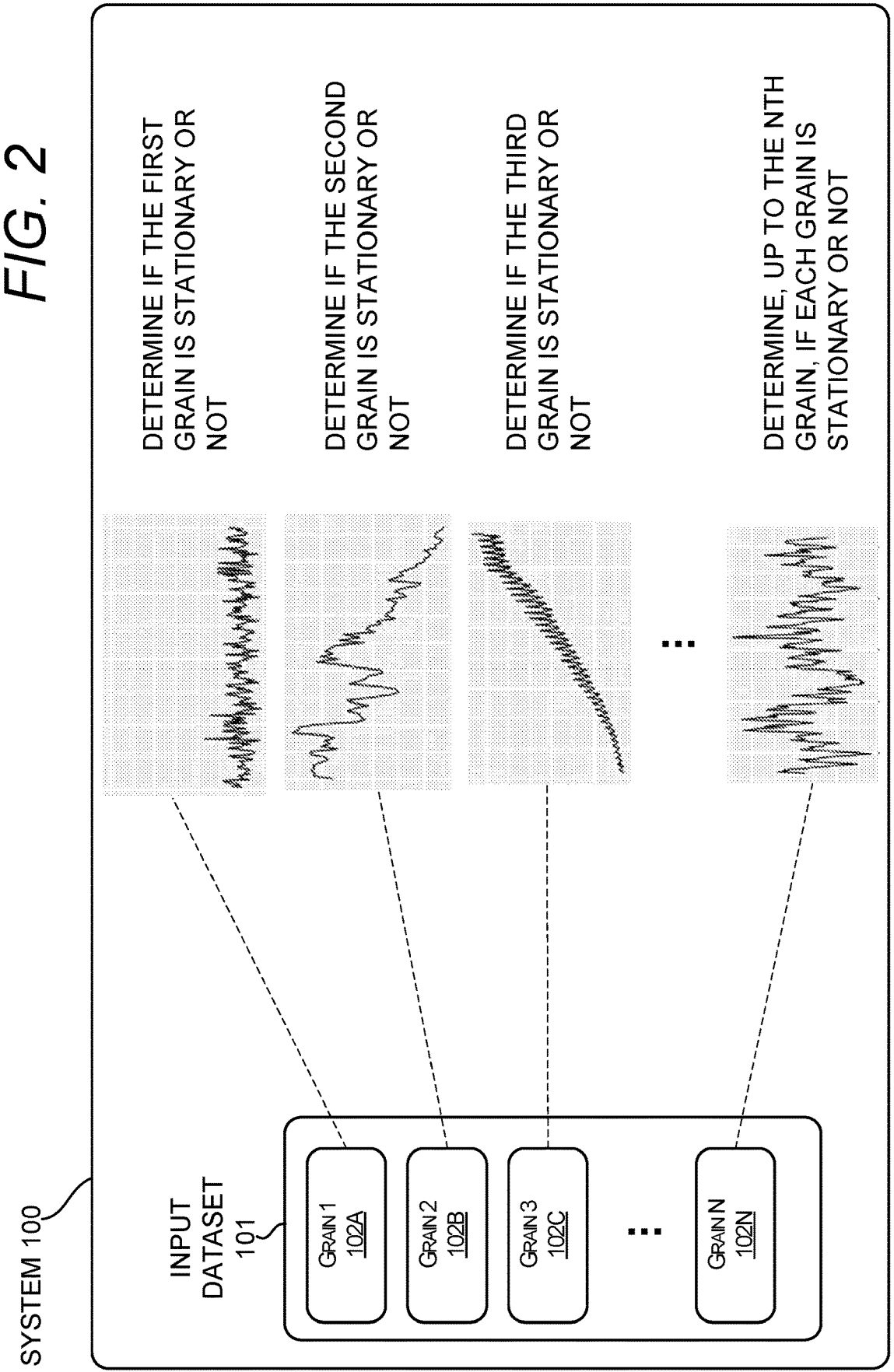
FIG. 2 shows an example time series dataset having non-stationary time series grains and stationary time series grains.

FIG. 2 shows an example time series dataset having non-stationary time series grains and stationary time series grains. As described above, the system analyzes individual time series grains of an input dataset. In this analysis, the system can utilize any suitable technique for determining if each grain is a non-stationary time series grain or a stationary time series grain. For example, the system can identify non-stationary time series grains and stationary time series grains by the use of parametric tests, unit root tests, linear regression-based tests, nonparametric tests, or any other suitable statistical approach.

In this example, the system analyzes each grain of the input dataset 101 and determines that the input dataset 101 comprises a first grain 102A that is stationary, a second grain 102B that is non-stationary, a third grain 102C that is non-stationary, up to an Nth grain 102N that is stationary. Once the system characterizes each grain, the system can determine the number of non-stationary grains and/or the number of stationary grains. A ratio can be determined, e.g., the number of stationary grains over the total number of grains in the dataset, or the number of non-stationary grains over the total number of grains in the dataset.

As shown in FIG. 3A, the system can compare the determined ratio, e.g., the number of stationary grains over the total number of grains of the dataset, with a given threshold, also referred to herein as a threshold value 111. In this embodiment, if the system determines that the percentage of stationary time series grains, or the ratio of the number of stationary time series grains over the total number of grains, is below a threshold value, the system causes an execution of computational operations for performing a select function to the entire time series dataset 101 to generate an output dataset 103 having modified grains 104. For instance, a first modified grain 104A is generated by applying a differencing function, or an equivalent function, to the first input grain 102A, the second modified grain 104B is generated by applying the differencing function to the second input grain 102B, etc.

As shown in FIG. 3B, if the system determines that the ratio is above the threshold value, the system does not execute the differencing function, and the system uses the original input dataset 101 as the output 103, which may be used an input to train a model. In one illustrative example, a threshold may be 0.1. Thus, if the ratio is 0.15, the system would not execute the differencing function, and the system uses the original input dataset 101 as the output 103 for training a model. However, if the if the ratio is 0.01, the system executes the differencing function and applies the function to the input dataset, and the system would generate an output 103 that has modified grains that are based on the grains of the original input dataset 101 being processed by the differencing function.

FIGS. 4A and 4B show another embodiment that may be used to control the execution of specific functions that are applied to a time series dataset. The system apples differencing functions either by checking the stationary grains versus all of the grains based on threshold or by checking the non-stationary grains versus all grains based on another threshold (1-threshold). Any method for the purposes of applying the differencing function only if non-stationary grains are the majority can be used. In this embodiment, the system uses ratios or percentages on the number of non-stationary time series grains and the other threshold, e.g., 1-threshold. As shown in FIG. 4A, the system can compare another determined ratio, e.g., the number of non-stationary grains over the total number of grains, with a given threshold. In this embodiment, if the system determines that the percentage of non-stationary time series grains, or the ratio of the number of non-stationary time series grains over the total number of grains, is above the threshold value, the system causes an execution of computational operations for performing a select function to the entire time series dataset 101 to generate an output dataset 103 having modified grains 104. For instance, first modified grain 104A is generated by applying a differencing function, or an equivalent function, to the first input grain 102A, the second modified grain 104B is generated by applying the differencing function to the second input grain 102B, etc.

However, as shown in FIG. 4B, if the system determines that the ratio of non-stationary grains over the total number of grains in the dataset 101 is below the threshold, the system does not execute the differencing function, and the system uses the original input dataset 101 as the output 103, which may be used an input to train a model. In one illustrative example, a threshold for this embodiment may be 0.9. Thus, if the ratio is 0.7, the system would not execute the differencing function, and the system uses the original input dataset 101 as the output 103. However, if the if the ratio is 0.91, the system would execute the differencing function, and the system would generate an output 103 that has modified grains that are based on the grains of the original input dataset 101 that are processed by the differencing function.

The disclosed techniques may also be adapted to scale to large datasets via two independent, complementary methods each addressing different means in which the dataset can grow in size. In some scenarios where stationarity detection is applied independently per series and the number of series is large, each series may be evaluated in parallel across one or more units of compute thereby providing linear scaling through the allocation of additional compute. Conversely, in instances where an individual series is large in number of timesteps, the series may be divided into multiple subsets with relevant statistics computed on each subset and subsequently merged. In addition, these statistics may be computed and merged exactly whereas other realizations may require the use of numerical approximations of the statistics to enable this computation. Computation over these subsets of a series may also be parallelized across multiple units of compute to accelerate computation. When both techniques are invoked jointly, multiple parallelization strategies are attainable including, but not limited to, hierarchical implementations as well as segmented implementations. Together, these techniques may be employed selectively to accelerate the stationarity detection and/or reduce the peak memory consumption on an individual unit of compute.

Figure 5:
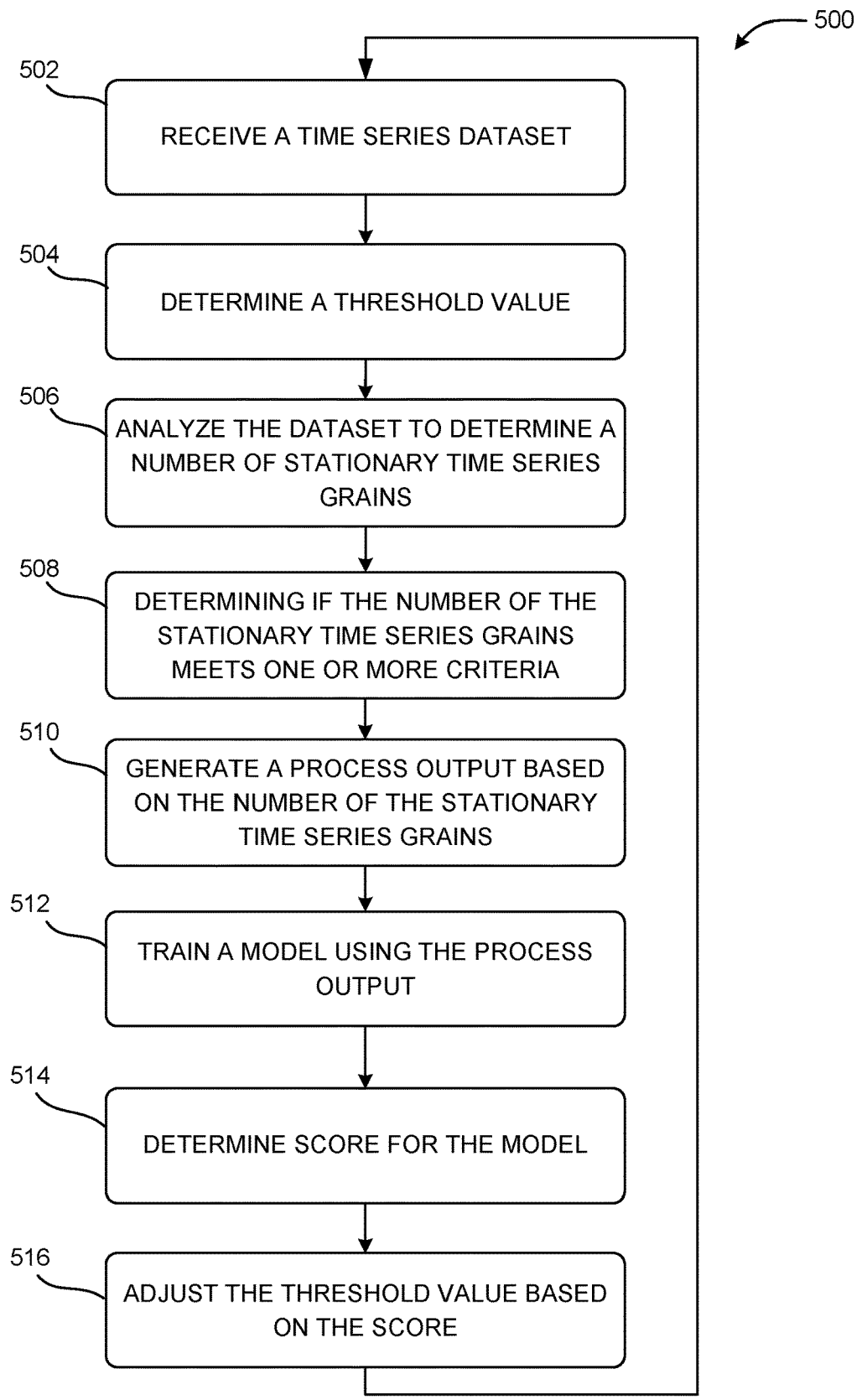
FIG. 5 is a flow diagram showing aspects of a routine for controlling select functions that are applied to a time series dataset based on the detection of stationary time series grains within the dataset.

Turning now to FIG. 5, aspects of a routine 500 for dynamically controlling select functions that are applied to a time series dataset based on the detection of stationary time series grains. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in its entirety. Some or all operations of the methods, and/or substantially equivalent operations, can be performed by execution of computer-readable instructions included on a computer-storage media and computer-readable media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 500 are described herein as being implemented, at least in part, by an application, component and/or circuit, such as a device module that can be included in any one of the memory components disclosed herein, including but not limited to RAM. In some configurations, the device module can be a dynamically linked library (DLL), a statically linked library, functionality enabled by an application programing interface (API), a compiled program, an interpreted program, a script or any other executable set of instructions. Data, such as input data or a signal from a sensor, received by the device module can be stored in a data structure in one or more memory components. The data can be retrieved from the data structure by addressing links or references to the data structure.

Although the following illustration refers to the components depicted in the present application, it can be appreciated that the operations of the routine may be also implemented in many other ways. For example, the routine may be implemented, at least in part, by a processor of another remote computer or a local circuit. In addition, one or more of the operations of the routine may alternatively or additionally be implemented, at least in part, by a chipset working alone or in conjunction with other software modules. Any service, circuit or application suitable for providing input data indicating the position or state of any device may be used in operations described herein.

With reference to FIG. 5, the routine 500 can begin at operation 502, where the system receives a time series dataset 101. The dataset 101 can include individual time series grains 102, also referred to herein as grains 102. Each time series grain can include discrete sets of data that provide values over a given time period. Each time series can include data pertaining to the same time period, partially overlapping time periods, or in some instances, each grain can cover different time periods. For instance, each grain may provide an output for a manufacturing process for a product over a particular time period, e.g., a year. Each grain may include output data from individual factories. For instance, the first grain 102A may provide a manufacturing output for a first factory, the second grain 102B may provide a manufacturing output for a second factory, etc.

At operation 504, the system can determine a threshold value. The threshold value can be from a user input or the threshold value can be from a profile, such as a profile of a particular manufacturing process, a particular manufacturing facility, etc. The threshold value can be static or dynamic. For instance, as described herein, a score can be generated to indicate the performance of a model. A model score that is less than a model threshold can be used to increase or decrease the threshold value for future iterations of the routine 500. A model score that is greater than a model threshold can be used to increase or decrease the threshold value for future iterations of the routine 500.

At operation 506, the system can analyze the dataset to determine a number of stationary time series grains and/or a number of non-stationary time series grains. This analysis is done on a grain-by-grain basis. Each grain can be characterized as stationary time series grains or non-stationary time series grains. Operation 506 can be done with any suitable technique for identifying stationary time series grains or non-stationary time series grains. This may include, but is not limited to, the use of parametric tests, unit root tests, linear regression-based tests, nonparametric tests, or any other suitable statistical approach.

At operation 508, the system can determine if the number of the stationary time series grains meets one or more criteria. In some embodiments, the number of the stationary time series grains can meet one or more criteria when a percentage or a ratio of stationary time series grains is below a threshold. As shown in FIG. 3A, the system can compare the determined ratio, e.g., the number of stationary grains over the total number of grains, with a given threshold, also referred to herein as a threshold value.

If the system determines that the percentage of stationary time series grains, or the ratio of the number of stationary time series grains over the total number of grains, is below a threshold value, then at operation 510, the system causes an execution of computational operations for performing a select function to the entire time series dataset 101 to generate an output dataset 103 having modified grains 104. For instance, a first modified grain 104A is generated by applying a differencing function, or an equivalent function, to the first input grain 102A, the second modified grain 104B is generated by applying the differencing function to the second input grain 102B, etc.

As shown in FIG. 3B, if the system determines that the ratio is above the threshold value, then at operation 510, the system does not execute the differencing function, and the system uses the original input dataset 101 as the output 103, which may be used an input to train a model. In one illustrative example, a threshold may be 0.1. Thus, if the ratio is 0.15, with a threshold of 0.1, the system would not execute the differencing function, and the system uses the original input dataset 101 as the output 103. However, if the if the ratio is 0.01, the system would execute the differencing function, and the system would generate an output 103 that has modified grains that are based on the grains of the original input dataset 101 being subjected to the differencing function.

As described herein and shown in FIG. 4A and FIG. 4B, operation 508 can include an analysis of the non-stationary time series grains to determine if the input dataset meets one or more criteria. In this embodiment, the number of the non-stationary time series grains can meet one or more criteria when a percentage or a ratio of stationary time series grains is above a threshold. This process is equivalent to the operation described above with respect to FIG. 3A and FIG. 3B, where the differencing function is controlled based on the detection of a threshold number of non-stationary time series grains instead of stationary time series grains.

At operation 512, the system can train a model using the output data 103. This can include any suitable technique for training a model. This can include suitable techniques for adjusting weights of a machine learning model based on the historical data that is conveyed in the output data 103.

At operation 514, the system can generate a score indicating the performance of the model. The model score is a metric that is used to evaluate the performance of a machine learning model. The score is calculated based on how well the model predicts the target variable on a test set of data. The score can be used to compare different models and to select the best performing model for a given task. Any suitable technique for generating a model score can be used in operation 514.

Operation 514 can also include the use of an inverse transform. In some embodiments, an inverse transform can be performed to inverse the differencing function on a dataset, if non-stationary grains are determined to be the majority of a dataset. The inverse transform is not be utilized, if the non-stationary grains are not determined to be the majority of the dataset.

After an inverse transform is done, the model score can still be used to evaluate the performance of the model. Since the score may not be directly comparable to the score obtained before the inverse transform was applied. This is because the inverse transform can change the scale and distribution of the predicted values. For example, suppose a model is trained to predict the production of a manufacturing process based on its features, such as the number of parts used, types of parts that are used, and a size of a product. If the inverse transform is applied to the predicted production numbers to recover the original scale, the model score can still be used to evaluate the performance of the model, but the scores may not be directly comparable to the scores obtained before the inverse transform was applied.

Next, at operation 516, the system may adjust the threshold value. A model score that is less than a model threshold can be used to increase or decrease the threshold value for future iterations of the routine 500. A model score that is greater than a model threshold can be used to increase or decrease the threshold value for future iterations of the routine 500. From operation 516, the routine 500 returns to operation 502 where additional iterations of the routine are executed using static or dynamic threshold values. The routine can be repeated through several iterations until the model score exceeds a threshold, and after which point adjustments to the threshold value may stop and the threshold value may become static.

In some embodiments, the differencing function may be applied to a subset of the grains of the dataset. Instead of applying the differencing function to the entire dataset, a system may apply the differencing function to the non-stationary grains, and not apply the differencing function to the stationary grains. This embodiment can be performed with or without the condition involving a threshold. After the selective processing of the differencing function to the non-stationary grains, then the entire dataset, including the stationary grains, are provided to a training process.

In some embodiments, the system may run into several issues with the dataset. In one example, a dataset may not meet one or more criteria. For example, a dataset may not meet one or more criteria if it has too many grains, e.g., a dataset may have more than a threshold number of grains. If this scenario is detected, the grains can be processed in parallel, as described herein. In another example, a dataset may not meet one or more criteria if it doesn't meet a latency constraint or the dataset is too large for a computer to process. In such scenarios, some grains of a dataset may be too large, e.g., a grain may have more than a threshold number of data points. In order to scale for grains that are too large, the system can divide a grain into chunks, which are also referred to herein as a "grain chunk." In response to determining that a grain is above a grain size threshold, e.g., have more than a threshold number of data points, the system can divide such grains into chunks. The division can be made such that each chunk is a threshold chunk size. Each chunk can be analyzed in parallel to derive one or more statistics regarding each chunk. The statistics of each chunk can be derived using any suitable technique for generating statistical data indicating a characteristic of a chunk, e.g., a score indicating if a chunk is stationary or non-stationary. The system can then combine the statistics on each chunk to generate a final value for the entire grain. This combination of statistics can include a merging of statistics, e.g. averaging, to produce a final grain statistic for stationarity evaluation or any other type of combination that allows each chunk to contribute a vote for determining grain stationarity. This process can be repeated for each grain.

Although the examples disclosed herein involve the detection of stationary grains, the scope of the current disclosure also includes equivalent techniques, which may include the detection of non-stationary grains. For example, in one example involving another threshold (e.g., a 1-threshold), a method for managing a time series dataset 101 that includes a number of time series grains 102 can include receiving the time series dataset (101); determining a threshold value (111); analyzing the time series grains (102) to identify a number of non-stationary time series grains (102B); determining that a ratio of the number of the non-stationary time series grains (102B) and a total number of grains (102) in the time series dataset (101) is above the threshold value (111); in response to determining that the ratio of the number of the non-stationary time series grains (102B) and the total number of grains in the time series dataset is above the threshold value (111): and causing an execution of computational operations for performing a differencing function to the time series dataset, the execution of the computational operations for performing the differencing function causing a generation of an output dataset (103), the output dataset (103) comprising modified grains that are generated from the differencing function applied to the time series grains (102) of the time series dataset (101); and utilizing the output dataset (103) to train a model (105) used for generating forecasting data.

In the embodiments described herein, the differencing function can be a first order function that is applied to all of the grains of the time series dataset or only non-stationary grains of the data set. The embodiments described herein can also include a static value for the threshold value through multiple iterations of the method. In the embodiments described herein, the threshold value can be a dynamic value that is adjusted through different iterations of the method, wherein the threshold value is increased or decreased based on a model score.

The method can also include determining a model score that quantifies a performance metric of the model; determining that the model score is below a model threshold; and adjusting the threshold value in response to determining that the model score is below the model threshold. The method for can also include causing an execution of computational operations to bypass the differencing function, in response to determining that the ratio of the number of the stationary time series grains and the total number of grains in the time series dataset is above the threshold value; and using the time series dataset (101) as the output dataset (103) to train the model (105) used for generating the forecasting data.

In some configurations, a method for managing a time series dataset (101) that includes a number of time series grains (102) can include: receiving the time series dataset (101); determining a threshold value (111); analyzing the time series grains (102) to identify a number of stationary time series grains (102A); determining that a ratio of the number of the stationary time series grains (102A) and a total number of grains (102) in the time series dataset (101) is below the threshold value (111); in response to determining that the ratio of the number of the stationary time series grains (102A) and the total number of grains in the time series dataset is below the threshold value: causing an execution of computational operations for performing a differencing function to the time series dataset, the execution of the computational operations for performing the differencing function causing a generation of an output dataset (103), the output dataset (103) comprising modified grains that are generated from the differencing function applied to the time series grains (102) of the time series dataset (101); and utilizing the output dataset (103) to train a model (105) used for generating forecasting data.

In the method, the differencing function can be a first order function that is applied to all of the grains of the time series dataset. In the method, the threshold value can be a static value through multiple iterations of the method. In the method, the threshold value can be a dynamic value that is adjusted through different iterations of the method, wherein the threshold value is increased or decreased based on a model score. The method can further comprise determining a model score that quantifies a performance metric of the model; determining that the model score is below a model threshold; and adjusting the threshold value in response to determining that the model score is below the model threshold. The method can further comprise, in response to determining that the ratio of the number of the stationary time series grains and the total number of grains in the time series dataset is above the threshold value, causing an execution of computational operations to bypass the differencing function, and using the time series dataset (101) as the output dataset (103) to train the model (105) used for generating the forecasting data, wherein the forecasting data is generated by process comprising: analyzing an output of the model to select a timeframe; and generating the forecasting data indicating a forecast of a trend from the timeframe based on at least one of a straight-line projection, a moving average projection, a simple linear regression projection, or a multiple linear regression projection. In some embodiments of the method, each grain is analyzed in parallel across one or more units of compute thereby providing linear scaling through the allocation of additional compute.

Figure 6:
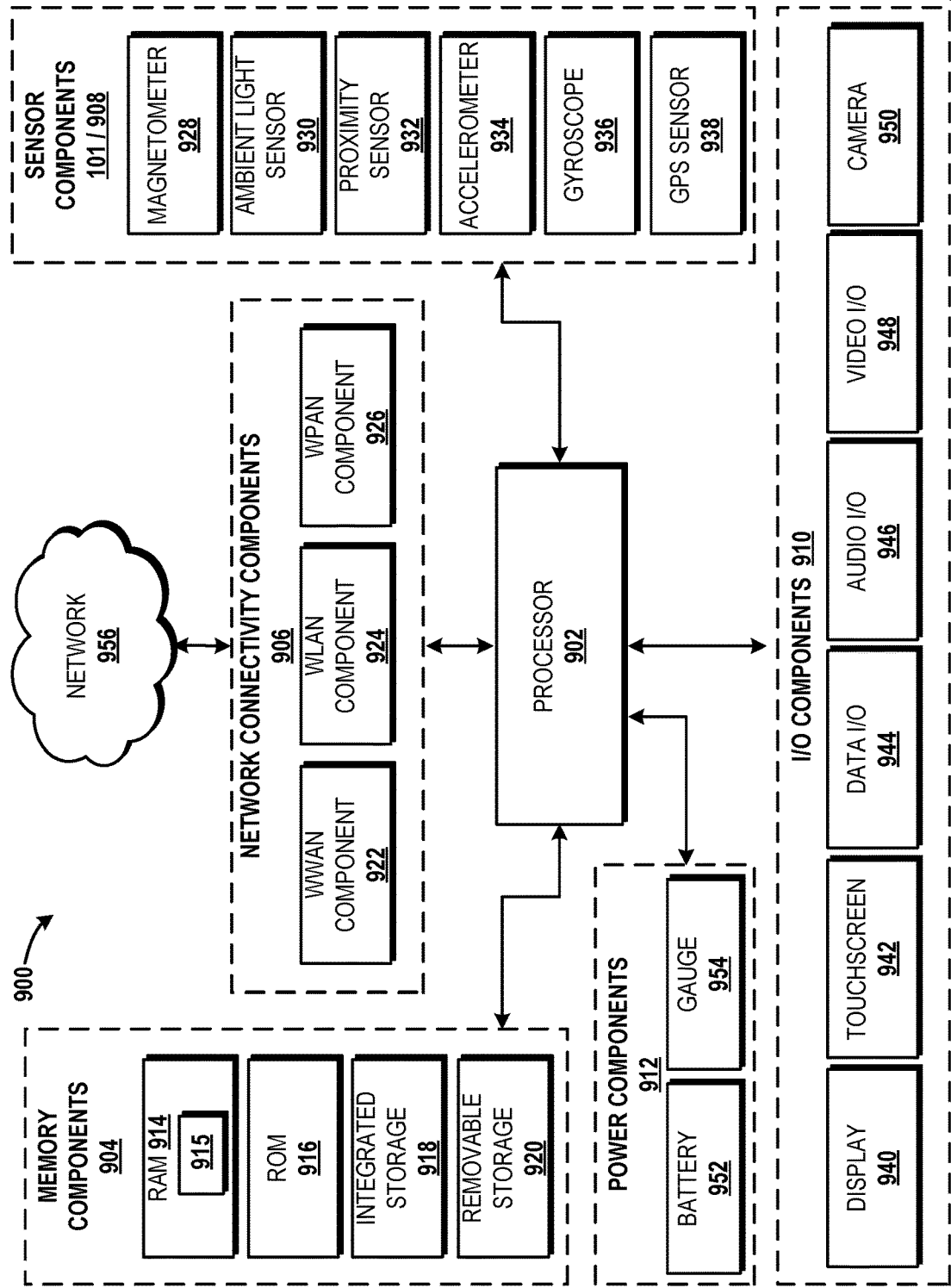
FIG. 6 is a computer architecture diagram illustrating a computing device architecture for a computing device capable of implementing aspects of the techniques and technologies presented herein.

Turning now to FIG. 6, an illustrative computing device architecture 900 for a computing device that is capable of executing various software components described herein. The computing device can be a head-mounted display unit, which is also referred to herein as a headset. The computing device architecture 900 is applicable to computing devices that facilitate mobile computing due, in part, to form factor, wireless connectivity, and/or battery-powered operation. The computing device architecture 900 can be the architecture of the system 100 of FIG. 1. In some configurations, the computing devices include, but are not limited to, a near-to-eye display device, e.g., glasses or a head mounted display unit. The computing device architecture 900 can also apply to any other device that may use or implement parts of the present disclosure, including, but not limited to, mobile telephones, tablet devices, slate devices, portable video game devices, and the like. Moreover, aspects of the computing device architecture 900 may be applicable to traditional desktop computers, portable computers (e.g., laptops, notebooks, ultra-portables, and netbooks), server computers, and other computer systems, such as those described herein. For example, the single touch and multi-touch aspects disclosed herein below may be applied to desktop computers that utilize a touchscreen or some other touch-enabled device, such as a touch-enabled track pad or touch-enabled mouse.

The computing device architecture 900 illustrated in FIG. 6 includes a processor 902, memory components 904, network connectivity components 906, sensor components 908, input/output components 912, and power components 912. In the illustrated configuration, the processor 902 is in communication with the memory components 904, the network connectivity components 906, the sensor components 908, the input/output ("I/O") components 910, and the power components 912. Although no connections are shown between the individuals components illustrated in FIG. 6, the components can interact to carry out device functions. In some configurations, the components are arranged so as to communicate via one or more busses (represented by one or more lines between the components).

The memory components 904 is connected to the CPU 902 through a mass storage controller (not shown) and a bus. The memory components 904 and its associated computer-readable media provide non-volatile storage for the computer architecture 900. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 900.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, the computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 900. For purposes the claims, the phrase "computer storage medium," "computer-readable storage medium," "computer-readable storage device," "non-transitory computer storage media" and variations thereof, does not include waves, signals, and/or other transitory and/or intangible communication media, per se. A storage device can include any type of solid state drive, optical drive, or a rotating media drive.

The processor 902 includes a central processing unit ("CPU") configured to process data, execute computer-executable instructions of one or more application programs, and communicate with other components of the computing device architecture 900 in order to perform various functionality described herein. The processor 902 may be utilized to execute aspects of the software components presented herein and, particularly, those that utilize, at least in part, a touch-enabled input.

In some configurations, the processor 902 includes a graphics processing unit ("GPU") configured to accelerate operations performed by the CPU, including, but not limited to, operations performed by executing general-purpose scientific and/or engineering computing applications, as well as graphics-intensive computing applications such as high-resolution video (e.g., 720P, 1030P, and higher resolution), video games, three-dimensional ("3D") modeling applications, and the like. In some configurations, the processor 902 is configured to communicate with a discrete GPU (not shown). In any case, the CPU and GPU may be configured in accordance with a co-processing CPU/GPU computing model, wherein the sequential part of an application executes on the CPU and the computationally intensive part is accelerated by the GPU.

In some configurations, the processor 902 is, or is included in, a system-on-chip ("SoC") along with one or more of the other components described herein below. For example, the SoC may include the processor 902, a GPU, one or more of the network connectivity components 906, and one or more of the sensor components 908. In some configurations, the processor 902 is fabricated, in part, utilizing a package-on-package ("PoP") integrated circuit packaging technique. The processor 902 may be a single core or multi-core processor.

The processor 902 may be created in accordance with an ARM architecture, available for license from ARM HOLDINGS of Cambridge, United Kingdom. Alternatively, the processor 902 may be created in accordance with an x86 architecture, such as is available from INTEL CORPORATION of Mountain View, California and others. In some configurations, the processor 902 is a SNAPDRAGON SoC, available from QUALCOMM of San Diego, California, a TEGRA SoC, available from NVIDIA of Santa Clara, California, a HUMMINGBIRD SoC, available from SAMSUNG of Seoul, South Korea, an Open Multimedia Application Platform ("OMAP") SoC, available from TEXAS INSTRUMENTS of Dallas, Texas, a customized version of any of the above SoCs, or a proprietary SoC.

The memory components 904 include random access memory ("RAM") 914, read-only memory ("ROM") 916, an integrated storage memory ("integrated storage") 918, or a removable storage memory ("removable storage") 920. In some configurations, the RAM 914 or a portion thereof, the ROM 916 or a portion thereof, and/or some combination the RAM 914 and the ROM 916 is integrated in the processor 902. In some configurations, the ROM 916 is configured to store a firmware, an operating system or a portion thereof (e.g., operating system kernel), and/or a bootloader to load an operating system kernel from the integrated storage 918 and/or the removable storage 920. The RAM or any other component can also store the device module 915 or other software modules for causing execution of the operations described herein.

The integrated storage 918 can include a solid-state memory, a hard disk, or a combination of solid-state memory and a hard disk. The integrated storage 918 may be soldered or otherwise connected to a logic board upon which the processor 902 and other components described herein also may be connected. As such, the integrated storage 918 is integrated in the computing device. The integrated storage 918 is configured to store an operating system or portions thereof, application programs, data, and other software components described herein.

The removable storage 920 can include a solid-state memory, a hard disk, or a combination of solid-state memory and a hard disk. In some configurations, the removable storage 920 is provided in lieu of the integrated storage 918. In other configurations, the removable storage 920 is provided as additional optional storage. In some configurations, the removable storage 920 is logically combined with the integrated storage 918 such that the total available storage is made available as a total combined storage capacity. In some configurations, the total combined capacity of the integrated storage 918 and the removable storage 920 is shown to a user instead of separate storage capacities for the integrated storage 918 and the removable storage 920.

The removable storage 920 is configured to be inserted into a removable storage memory slot (not shown) or other mechanism by which the removable storage 920 is inserted and secured to facilitate a connection over which the removable storage 920 can communicate with other components of the computing device, such as the processor 902. The removable storage 920 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 904 can store an operating system. According to various configurations, the operating system includes, but is not limited to WINDOWS MOBILE OS from Microsoft Corporation of Redmond, Washington, WINDOWS PHONE OS from Microsoft Corporation, WINDOWS from Microsoft Corporation, BLACKBERRY OS from Research In Motion Limited of Waterloo, Ontario, Canada, IOS from Apple Inc. of Cupertino, California, and ANDROID OS from Google Inc. of Mountain View, California. Other operating systems are contemplated.

The network connectivity components 906 include a wireless wide area network component ("WWAN component") 922, a wireless local area network component ("WLAN component") 924, and a wireless personal area network component ("WPAN component") 926. The network connectivity components 906 facilitate communications to and from the network 956 or another network, which may be a WWAN, a WLAN, or a WPAN. Although only the network 956 is illustrated, the network connectivity components 906 may facilitate simultaneous communication with multiple networks. For example, the network connectivity components 906 may facilitate simultaneous communications with multiple networks via one or more of a WWAN, a WLAN, or a WPAN.

The network 956 may be or may include a WWAN, such as a mobile telecommunications network utilizing one or more mobile telecommunications technologies to provide voice and/or data services to a computing device utilizing the computing device architecture 900 via the WWAN component 922. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 956 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 956 may be configured to provide voice and/or data communications with any combination of the above technologies. The network 956 may be configured to or adapted to provide voice and/or data communications in accordance with future generation technologies.

In some configurations, the WWAN component 922 is configured to provide dual-multi-mode connectivity to the network 956. For example, the WWAN component 922 may be configured to provide connectivity to the network 956, wherein the network 956 provides service via GSM and UMTS technologies, or via some other combination of technologies. Alternatively, multiple WWAN components 922 may be utilized to perform such functionality, and/or provide additional functionality to support other non-compatible technologies (i.e., incapable of being supported by a single WWAN component). The WWAN component 922 may facilitate similar connectivity to multiple networks (e.g., a UMTS network and an LTE network).

The network 956 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 924 is configured to connect to the network 956 via the WI-FI access points. Such connections may be secured via various encryption technologies including, but not limited, WI-FI Protected Access ("WPA"), WPA2, Wired Equivalent Privacy ("WEP"), and the like.

The network 956 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 926 is configured to facilitate communications with other devices, such as peripherals, computers, or other computing devices via the WPAN.

The sensor components 908 include a magnetometer 928, an ambient light sensor 930, a proximity sensor 932, an accelerometer 934, a gyroscope 936, and a Global Positioning System sensor ("GPS sensor") 938. It is contemplated that other sensors, such as, but not limited to, temperature sensors or shock detection sensors, also may be incorporated in the computing device architecture 900.

The magnetometer 928 is configured to measure the strength and direction of a magnetic field In some configurations the magnetometer 928 provides measurements to a compass application program stored within one of the memory components 904 in order to provide a user with accurate directions in a frame of reference including the cardinal directions, north, south, east, and west. Similar measurements may be provided to a navigation application program that includes a compass component. Other uses of measurements obtained by the magnetometer 928 are contemplated.

The ambient light sensor 930 is configured to measure ambient light. In some configurations, the ambient light sensor 930 provides measurements to an application program stored within one of the memory components 904 in order to automatically adjust the brightness of a display (described below) to compensate for low-light and high-light environments. Other uses of measurements obtained by the ambient light sensor 930 are contemplated.

The proximity sensor 932 is configured to detect the presence of an object in proximity to the computing device without direct contact. In some configurations, the proximity sensor 932 detects the presence of a user's body (e.g., the user's face) and provides this information to an application program stored within one of the memory components 904 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 932 are contemplated.

The accelerometer 934 is configured to measure proper acceleration. In some configurations, output from the accelerometer 934 is used by an application program as an input mechanism to control some functionality of the application program. For example, the application program may be a video game in which a character, a portion thereof, or an object is moved or otherwise manipulated in response to input received via the accelerometer 934. In some configurations, output from the accelerometer 934 is provided to an application program for use in switching between landscape and portrait modes, calculating coordinate acceleration, or detecting a fall. Other uses of the accelerometer 934 are contemplated.

The gyroscope 936 is configured to measure and maintain orientation. In some configurations, output from the gyroscope 936 is used by an application program as an input mechanism to control some functionality of the application program. For example, the gyroscope 936 can be used for accurate recognition of movement within a 3D environment of a video game application or some other application. In some configurations, an application program utilizes output from the gyroscope 936 and the accelerometer 934 to enhance control of some functionality of the application program. Other uses of the gyroscope 936 are contemplated.

The GPS sensor 938 is configured to receive signals from GPS satellites for use in calculating a location. The location calculated by the GPS sensor 938 may be used by any application program that requires or benefits from location information. For example, the location calculated by the GPS sensor 938 may be used with a navigation application program to provide directions from the location to a destination or directions from the destination to the location. Moreover, the GPS sensor 938 may be used to provide location information to an external location-based service, such as E911 service. The GPS sensor 938 may obtain location information generated via WI-FI, WIMAX, and/or cellular triangulation techniques utilizing one or more of the network connectivity components 906 to aid the GPS sensor 938 in obtaining a location fix. The GPS sensor 938 may also be used in Assisted GPS ("A-GPS") systems.

The I/O components 910 include a display 940, a touchscreen 942, a data I/O interface component ("data I/O") 944, an audio I/O interface component ("audio I/O") 946, a video I/O interface component ("video I/O") 948, and a camera 950. In some configurations, the display 940 and the touchscreen 942 are combined. In some configurations two or more of the data I/O component 944, the audio I/O component 946, and the video I/O component 948 are combined. The I/O components 910 may include discrete processors configured to support the various interface described below, or may include processing functionality built-in to the processor 902.

The display 940 is an output device configured to present information in a visual form. In particular, the display 940 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 940 is a liquid crystal display ("LCD") utilizing any active or passive matrix technology and any backlighting technology (if used). In some configurations, the display 940 is an organic light emitting diode ("OLED") display. Other display types are contemplated.

The touchscreen 942, also referred to herein as a "touch-enabled screen," is an input device configured to detect the presence and location of a touch. The touchscreen 942 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 942 is incorporated on top of the display 940 as a transparent layer to enable a user to use one or more touches to interact with objects or other information presented on the display 940. In other configurations, the touchscreen 942 is a touch pad incorporated on a surface of the computing device that does not include the display 940. For example, the computing device may have a touchscreen incorporated on top of the display 940 and a touch pad on a surface opposite the display 940.

In some configurations, the touchscreen 942 is a single-touch touchscreen. In other configurations, the touchscreen 942 is a multi-touch touchscreen. In some configurations, the touchscreen 942 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 942. As such, a developer may create gestures that are specific to a particular application program.

In some configurations, the touchscreen 942 supports a tap gesture in which a user taps the touchscreen 942 once on an item presented on the display 940. The tap gesture may be used for various reasons including, but not limited to, opening or launching whatever the user taps. In some configurations, the touchscreen 942 supports a double tap gesture in which a user taps the touchscreen 942 twice on an item presented on the display 940. The double tap gesture may be used for various reasons including, but not limited to, zooming in or zooming out in stages. In some configurations, the touchscreen 942 supports a tap and hold gesture in which a user taps the touchscreen 942 and maintains contact for at least a pre-defined time. The tap and hold gesture may be used for various reasons including, but not limited to, opening a context-specific menu.

In some configurations, the touchscreen 942 supports a pan gesture in which a user places a finger on the touchscreen 942 and maintains contact with the touchscreen 942 while moving the finger on the touchscreen 942. The pan gesture may be used for various reasons including, but not limited to, moving through screens, images, or menus at a controlled rate. Multiple finger pan gestures are also contemplated. In some configurations, the touchscreen 942 supports a flick gesture in which a user swipes a finger in the direction the user wants the screen to move. The flick gesture may be used for various reasons including, but not limited to, scrolling horizontally or vertically through menus or pages. In some configurations, the touchscreen 942 supports a pinch and stretch gesture in which a user makes a pinching motion with two fingers (e.g., thumb and forefinger) on the touchscreen 942 or moves the two fingers apart. The pinch and stretch gesture may be used for various reasons including, but not limited to, zooming gradually in or out of a website, map, or picture.

Although the above gestures have been described with reference to the use one or more fingers for performing the gestures, other appendages such as toes or objects such as styluses may be used to interact with the touchscreen 942. As such, the above gestures should be understood as being illustrative and should not be construed as being limiting in any way.

The data I/O interface component 944 is configured to facilitate input of data to the computing device and output of data from the computing device. In some configurations, the data I/O interface component 944 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 946 is configured to provide audio input and/or output capabilities to the computing device. In some configurations, the audio I/O interface component 946 includes a microphone configured to collect audio signals. In some configurations, the audio I/O interface component 946 includes a headphone jack configured to provide connectivity for headphones or other external speakers. In some configurations, the audio I/O interface component 946 includes a speaker for the output of audio signals. In some configurations, the audio I/O interface component 946 includes an optical audio cable out.

The video I/O interface component 948 is configured to provide video input and/or output capabilities to the computing device. In some configurations, the video I/O interface component 948 includes a video connector configured to receive video as input from another device (e.g., a video media player such as a DVD or BLURAY player) or send video as output to another device (e.g., a monitor, a television, or some other external display). In some configurations, the video I/O interface component 948 includes a High-Definition Multimedia Interface ("HDMI"), mini-HDMI, micro-HDMI, DisplayPort, or proprietary connector to input/output video content. In some configurations, the video I/O interface component 948 or portions thereof is combined with the audio I/O interface component 946 or portions thereof.

The camera 950 can be configured to capture still images and/or video. The camera 950 may utilize a charge coupled device ("CCD") or a complementary metal oxide semiconductor ("CMOS") image sensor to capture images. In some configurations, the camera 950 includes a flash to aid in taking pictures in low-light environments. Settings for the camera 950 may be implemented as hardware or software buttons. The camera can also include any type of sensor using any type of modality, e.g., a first modality may be under infrared, a second modality may be under a different spectrum, e.g., visible light, laser, etc. The camera may also include a time-of-flight sensor which can operate using any suitable medium, e.g., sonar, radar, etc. the camera can also be in the form of a lidar sensor for capturing images and distances device and will object in a surrounding environment.

Although not illustrated, one or more hardware buttons may also be included in the computing device architecture 900. The hardware buttons may be used for controlling some operational aspect of the computing device. The hardware buttons may be dedicated buttons or multi-use buttons. The hardware buttons may be mechanical or sensor-based.

The illustrated power components 914 include one or more batteries 952, which can be connected to a battery gauge 954. The batteries 952 may be rechargeable or disposable. Rechargeable battery types include, but are not limited to, lithium polymer, lithium ion, nickel cadmium, and nickel metal hydride. Each of the batteries 952 may be made of one or more cells.

The battery gauge 954 can be configured to measure battery parameters such as current, voltage, and temperature. In some configurations, the battery gauge 954 is configured to measure the effect of a battery's discharge rate, temperature, age and other factors to predict remaining life within a certain percentage of error. In some configurations, the battery gauge 954 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 912 may also include a power connector, which may be combined with one or more of the aforementioned I/O components 910. The power components 912 may interface with an external power system or charging equipment via an I/O component.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method for managing a time series dataset that includes a number of time series grains, the method comprising:

receiving the time series dataset;

determining a threshold value;

analyzing the time series grains to identify a number of stationary time series grains;

determining that a ratio of the number of the stationary time series grains and a total number of grains in the time series dataset is below the threshold value;

in response to determining that the ratio of the number of the stationary time series grains and the total number of grains in the time series dataset is below the threshold value:

causing an execution of computational operations for performing a differencing function to the time series dataset, the execution of the computational operations for performing the differencing function causing a generation of an output dataset, the output dataset comprising modified grains that are generated from the differencing function applied to the time series grains of the time series dataset; and utilizing the output dataset to train a model used for generating forecasting data.

2. The method of claim 1, wherein the differencing function is a first order function that is applied to all of the grains of the time series dataset.

3. The method of claim 1, wherein the threshold value is a static value through multiple iterations of the method.

4. The method of claim 1, wherein the threshold value is a dynamic value that is adjusted through different iterations of the method, wherein the threshold value is increased or decreased based on a model score.

5. The method of claim 1, wherein the method further comprises:
   determining a model score that quantifies a performance metric of the model;
   determining that the model score is below a model threshold; and
   adjusting the threshold value in response to determining that the model score is below the model threshold.

6. The method of claim 1, wherein the method further comprises:
   in response to determining that the ratio of the number of the stationary time series grains and the total number of grains in the time series dataset is above the threshold value, causing an execution of computational operations to bypass the differencing function, and using the time series dataset as the output dataset to train the model used for generating the forecasting data, wherein the forecasting data is generated by process comprising:
   analyzing an output of the model to select a timeframe; and
   generating the forecasting data indicating a forecast of a trend from the timeframe based on at least one of a straight-line projection, a moving average projection, a simple linear regression projection, or a multiple linear regression projection.

7. The method of claim 1, wherein each grain is analyzed in parallel across one or more units of compute thereby providing linear scaling through allocation of additional compute.

8. A computer-readable storage medium for managing a time series dataset that includes a number of time series grains, the computer-readable storage medium having encoded thereon computer-executable instructions to cause one or more processing units of a system to: receive the time series dataset; determine a threshold value; analyze the time series grains to identify a number of stationary time series grains; determine that a ratio of the number of the stationary time series grains and the total number of grains in the time series dataset is below the threshold value; in response to determining that the ratio of the number of the stationary time series grains and the total number of grains in the time series dataset is below the threshold value: cause an execution of computational operations for performing a differencing function to the time series dataset, the execution of the computational operations for performing the differencing function causing a generation of an output dataset, the output dataset comprising modified grains that are generated from the differencing function applied to the time series grains of the time series dataset; and utilize the output dataset to train a model used for generating forecasting data.

9. The computer-readable storage medium of claim 8, wherein the differencing function is a first order function that is applied to all of the grains of the time series dataset.

10. The computer-readable storage medium of claim 8, wherein the threshold value is a static value through multiple iterations.

11. The computer-readable storage medium of claim 8, wherein the threshold value is a dynamic value that is adjusted through different iterations, wherein the threshold value is increased or decreased based on a model score.

12. The computer-readable storage medium of claim 8, wherein the instructions further cause the one or more processing units to:
    determining a model score that quantifies a performance metric of the model;
    determining that the model score is below a model threshold; and
    adjusting the threshold value in response to determining that the model score is below the model threshold.

13. The computer-readable storage medium of claim 8, wherein the instructions further cause the one or more processing units to cause an execution of computational operations to bypass the differencing function, and using the time series dataset as the output dataset to train the model used for generating the forecasting data, in response to determining that the ratio of the number of the stationary time series grains and the total number of grains in the time series dataset is above the threshold value.

14. The computer-readable storage medium of claim 8, wherein each grain is analyzed in parallel across one or more units of compute thereby providing linear scaling through allocation of additional compute.

15. A computing device for managing a time series dataset that includes a number of time series grains, comprising:
    one or more processing units; and
    a computer-readable storage medium having encoded thereon computer-executable instructions to cause the one or more processing units to:
    receive the time series dataset;
    determine a threshold value;
    analyze the time series grains to identify a number of stationary time series grains;
    determine that a ratio of the number of the stationary time series grains and a total number of grains in the time series dataset is below the threshold value;
    in response to determining that the ratio of the number of the stationary time series grains and the total number of grains in the time series dataset is below the threshold value:
    cause an execution of computational operations for performing a differencing function to the time series dataset, the execution of the computational operations for performing the differencing function causing a generation of an output dataset, the output dataset comprising modified grains that are generated from the differencing function applied to the time series grains of the time series dataset; and
    utilize the output dataset to train a model used for generating forecasting data.

16. The computing device of claim 15, wherein the differencing function is a first order function that is applied to all of the grains of the time series dataset.

17. The computing device of claim 15, wherein the threshold value is a static value through multiple iterations.

18. The computing device of claim 15, wherein the threshold value is a dynamic value that is adjusted through different iterations, wherein the threshold value is increased or decreased based on a model score.

19. The computing device of claim 15, wherein the instructions further cause the one or more processing units to:
    determining that a grain of the time series dataset is above an individual grain size threshold;

in response to determining that the individual grain of the time series dataset is above the grain size threshold, dividing the individual grain into chunks;

generating one or more statistics regarding each chunk, wherein the one or more statistics regarding each chunk indicate characteristics of each chunk;

combining the one or more statistics regarding each chunk to determine if the individual grain is stationary or non-stationary.

20. The computing device of claim 15, wherein the instructions further cause the one or more processing units to cause an execution of computational operations to bypass the differencing function, and using the time series dataset as the output dataset to train the model used for generating the forecasting data, in response to determining that the ratio of the number of the stationary time series grains and the total number of grains in the time series dataset is above the threshold value.

* * * * *